United States Patent Office 3,684,655
Patented Aug. 15, 1972

3,684,655
PROCESS FOR PRODUCING N-ACETYLGLUTAMINE
Yuichi Noguchi, Junichi Nakajima, Tetsuo Uno, and Toru Nakanishi, Hofu-shi, Japan, assignors to Kyowa Hakko Kogyo Co., Ltd., Tokyo, Japan
No Drawing. Continuation of application Ser. No. 584,989, Oct. 7, 1966. This application July 10, 1968, Ser. No. 743,642
Claims priority, application Japan, Oct. 7, 1965, 40/61,035
Int. Cl. C12d 13/10
U.S. Cl. 195—29  13 Claims

ABSTRACT OF THE DISCLOSURE

A process for producing N-acetylglutamine by fermentation which comprises culturing a suitable microorganism under aerobic conditions in an aqueous nutrient medium containing at least 0.2 mole per liter, preferably 0.5 to 0.8 mole per liter, of ammonium ion and of chloride ion. Especially good yields are obtained by using sugars as the carbon source and ammonium chloride in the medium. Microorganisms belonging to the genera Brevibacterium and Micrococcus are exemplified.

CROSS REFERENCE TO RELATED APPLICATION

This application is a continuation of copending application Ser. No. 584,989, filed on Oct. 7, 1966 now abandoned.

This invention relates to a process for producing N-acetylglutamine. More particularly, it relates to a process for the production of N-acetylglutamine by fermentation. Even more particularly, the invention relates to a process for the production of N-acetylglutamine by fermentation with microorganisms in a nutrient medium containing the ammonium and the chloride ions.

N - acetylglutamine (N-AGM) has been prepared in the prior art by a fermentation method wherein microorganisms belonging to the genera Aerobacter, Proteus, Serratia, Bacillus, Brevibacterium, Micrococcus, Microbacterium, Arthrobacter, Streptomyces and Escherichia are cultured under appropriate conditions, and the desired N-AGM is obtained from the resultant culture liquor (Japanese patent publication No. 18,035/1965). However, the process reported in this publication results in a large production ratio of glutamic acid to N-acetylglutamine, i.e., the N-acetylglutamine is produced as a by-product concurrently with the production of glutamic acid. Accordingly, the resultant concentration of N-acetylglutamine in the culture liquor is low and, thus, the yield thereof obtained is extremely low.

N - acetylglutamine being a valuable substance, the present inventors observed the disadvantages of the conventional methods which have been used for producing this compound and, accordingly, one of the objects of the present invention is to provide an improved process for the preparation of N-acetylglutamine which overcomes the disadvantages and deficiencies of the prior art methods.

Another object of the present invention is to provide a process for producing N-acetylglutamine which may be carried out in an efficacious and simple manner.

A further object of the invention is to provide a process for preparing N-acetylglutamine by fermentation which gives the product in high concentration and high yield.

A still further object of the invention is to provide a process for producing N - acetylglutamine by fermentation which may be carried out advantageously on an economically feasible industrial scale to give a high yield of product.

These and other objects and advantages of the present invention will become apparent to those skilled in the art from a consideration of the following specification and claims.

In accordance with the present invention, it has been found that the production amount of N-acetylglutamine is greatly increased by culturing microorganisms capable of producing N - acetylglutamine in a culture medium containing a sugar as a source of carbon and chloride ions in high concentration and to which is added an ammonium salt as a nitrogen source in a quantity which is over and above that necessary for the growth of the microorganism employed and for the production of glutamic acid. In particular, the nutrient medium should contain more than 0.2 mole per liter of ammonium ion as well as more than 0.2 mole per liter of chloride ion. Most effective results are obtained with amounts of ammonium and of chloride ion, respectively, of up to about 0.5–0.8 mole per liter. By following this method, it is possible to extract a large amount of N-acetylglutamine from the resultant culture liquor. It is believed that the heretofore used processes for producing N-acetylglutamine by fermentation have not been carried out in the presence of ammonium and chloride ions in such high concentrations, and it is this factor that is one of the most important characteristics of the present invention.

When microorganisms capable of producing N-acetylglutamine are cultured according to the process of the present invention, the production amout of N-acetylglutamine obtained in the cluture liquor ranges from about 30 to 40 mg./ml. This corresponds to a yield of about 30% with respect to the amount of sugar employed as the starting source of carbon. Moreover, it is noted that the total amount of production of glutamic acid and glutamine with respect to the amount of N-acetylglutamine obtained is greatly reduced to a ratio of less than 3–5:1 by weight. This is a particularly remarkable effect.

In order to indicate some of the advantages of the present invention pointed out above, the relationship between the concentration of ammonium ion and that of chloride ion employed with respect to the amount of N - acetylglutamine, glutamic acid and glutamine produced is shown in Tables 1, 2 and 3 hereinbelow. In these experiments, *Micrococcus glutamicus* M–34 ATCC 21009 was employed as the N-acetylglutamine producing strain. Culturing was carried out therewith with aerobic shaking of the culture in flasks for a period of 72 hours. The composition of the culture medium employed was as follows, the percentages being by weight per liter of water:

| | | |
|---|---|---|
| Glucose | percent | 12.0 |
| $KH_2PO_4$ | do | 0.05 |
| $K_2HPO_4$ | do | 0.05 |
| $MgSO_4 \cdot 7H_2O$ | do | 0.05 |
| $MnSO_4 \cdot 4H_2O$ | do | 0.002 |
| $FeSO_4 \cdot 7H_2O$ | do | 0.002 |
| Urea | do | 0.5 |
| Biotin | $\gamma/l$ | 4–6 |

TABLE 1

| (NH$_4$)$_2$SO$_4$ (percent) | NaCl (percent) | NH$_4^+$ (mole/l.) | Cl$^-$ (mole/l.) | Amount produced | | |
|---|---|---|---|---|---|---|
| | | | | N-AGM | Glutamic acid | Glutamine |
| 1.26 | 0 | 0.187 | 0 | 3.6 | 15.2 | 0.8 |
| | 1.23 | 0.187 | 0.187 | 5.2 | 11.3 | 1.2 |
| | 2.46 | 0.187 | 0.374 | 8.8 | 8.4 | 1.3 |
| | 3.69 | 0.187 | 0.561 | 12.7 | 3.1 | 1.4 |
| | 4.92 | 0.187 | 0.748 | 14.1 | 1.8 | 1.6 |
| 2.52 | 0 | 0.374 | 0 | 6.7 | 18.3 | 1.4 |
| | 1.23 | 0.374 | 0.187 | 10.4 | 13.9 | 2.6 |
| | 2.46 | 9.374 | 0.374 | 13.6 | 9.2 | 3.2 |
| | 3.69 | 0.374 | 0.561 | 17.2 | 3.6 | 4.1 |
| | 4.92 | 0.374 | 0.748 | 19.3 | 2.1 | 5.2 |
| 3.78 | 0 | 0.561 | 0 | 9.9 | 14.1 | 2.9 |
| | 1.23 | 0.561 | 0.187 | 15.3 | 11.6 | 3.6 |
| | 2.46 | 0.561 | 0.374 | 22.4 | 5.4 | 5.1 |
| | 3.69 | 0.561 | 0.561 | 30.2 | 3.6 | 6.2 |
| | 4.92 | 0.561 | 0.748 | 26.2 | 2.1 | 6.3 |
| 5.04 | 0 | 0.748 | 0 | 15.8 | 11.7 | 3.8 |
| | 1.23 | 0.748 | 0.187 | 17.4 | 7.9 | 4.4 |
| | 2.46 | 0.748 | 0.374 | 24.8 | 4.2 | 5.7 |
| | 3.69 | 0.748 | 0.561 | 37.2 | 2.1 | 6.2 |
| | 4.92 | 0.748 | 0.748 | 36.2 | 0.5 | 6.3 |

Ammonium sulfate was employed as the source of ammonium ion, while sodium chloride was employed as the source of chloride ion in the experiments shown in Table 1. These results clearly show that the amount of N-acetylglutamine produced is increased in some degree by raising the concentration of ammonium ion in the culture medium. Of significance is the fact that the amount of by-product amino acid produced is almost constant and no significant change is observed. However, when sodium chloride is further added to the medium, thereby increasing the concentration of chloride ion, the production amount of N-acetylglutamine is promoted to a great extent. In fact, when the concentration of both ions is greater than 0.2 mole per liter, the production ratio of N-acetylglutamine to glutamic acid is inverted. When the concentration of both ions reaches a level of from 0.5 to 0.8 mole per liter, the glutamic acid is almost completely converted into N-acetylglutamine, thus resulting in a high concentration of N-acetylglutamine in the culture liquor and thereby a high yield thereof with respect to the amount of sugar employed.

The experiments shown in Table 3 were carried out with the use of ammonium chloride as the source of both the ammonium and the chloride ions. Again, other than this, the experiments were conducted in the same manner as in Tables 1 and 2. From Table 3, it is clear that the amount of N-acetylglutamine produced is greatly promoted when an amount of more than 0.2 mole per liter of ammonium chloride is employed in the culture medium. In particular, the amount of by-product amino acid produced with respect to the amount of N-acetylglutamine is reduced significantly at a concentration of ammonium chloride of from 0.5 to 0.8 mole per liter. The experiments of Table 3 indicate that the addition of ammonium and chloride ions with the use of ammonium chloride seems to be more effective than with the use of ammonium sulfate and the source of chloride ions shown in Tables 1 and 2.

Microorganisms capable of producing N-acetylglut-

TABLE 2

| (NH$_4$)$_2$SO$_4$ (percent) | Amount ion-containing compound added (percent) | Cl$^-$ (mole/l.) | Amount produced (mg./ml.) | | |
|---|---|---|---|---|---|
| | | | N-AGM | Glutamic acid | Glutamine |
| 3.78 | No addition | | 5.8 | 17.4 | 1.3 |
| 3.78 | KCl, 1.0 | 0.13 | 9.7 | 13.6 | 2.1 |
| | KCl, 2.0 | 0.27 | 16.6 | 8.6 | 3.4 |
| | KCl, 3.0 | 0.40 | 21.2 | 6.3 | 4.5 |
| | KCl, 4.0 | 0.53 | 27.2 | 4.1 | 4.8 |
| 3.78 | CaCl$_2$, 1.0 | 0.18 | 10.6 | 8.0 | 2.2 |
| | CaCl$_2$, 2.0 | 0.36 | 18.2 | 5.4 | 3.4 |
| | CaCl$_2$, 3.0 | 0.54 | 23.3 | 4.0 | 5.6 |
| | CaCl$_2$, 4.0 | 0.72 | 28.6 | 2.9 | 6.4 |

Table 2 shows the results of experiments wherein the sodium chloride shown in Table 1 was replaced by potassium chloride and calcium chloride, respectively, as the sources of chloride ion. Otherwise, the experiments were carried out in the same manner as those of Table 1. It is clear from Table 2 that the results are approximately the same as with the case of the use of sodium chloride as the chloride ion source.

TABLE 3

| NH$_4$Cl (percent) | NH$_4^+$, Cl$^-$ (each in mole/l.) | Amount produced (mg./ml.) | | |
|---|---|---|---|---|
| | | N-AGM | Glutamic acid | Glutamine |
| 1.0 | 0.187 | 9.2 | 11.8 | 1.0 |
| 2.0 | 0.374 | 19.4 | 7.8 | 2.2 |
| 3.0 | 0.561 | 22.8 | 3.9 | 3.6 |
| 4.0 | 0.748 | 36.2 | 1.2 | 4.8 |
| 5.0 | 0.935 | 27.8 | 0.8 | 4.2 | amine which may be advantageously used in the present invention include those of the genera Micrococcus, Brevibacterium and the like. Specifically, the novel microorganisms *Micrococcus glutamicus* M-34 ATCC 21009, *Micrococcus glutamicus* MF-35 ATCC 21010, *Micrococcus glutamicus* MF-39 ATCC 21011, obtained from *Micrococcus glutamicus* M-560 ATCC 13761 [Bull. Agr. Chem. Soc. Japan, vol. 22, No. 3, pp. 176-185 (1958)] by natural isolates, and *Brevibacterium ammoniagenes* No. 4602 ATCC 21012, obtained by monocolony isolation, may be employed quite successfully.

As for the composition of the nutrient culture medium to be employed, either a synthetic or a natural culture medium is suitable as long as it contains the essential nutrients for the growth of the microorganism employed. Such nutrients are well known in the art and include substances such as a carbon source, a nitrogen source, inorganic compounds and the like which are utilized by the microorganism in appropriate amounts. Thus, as a carbon source, there may be mentioned, by way of example, sugars such as glucose, sucrose, fructose, mannose, galactose, maltose, lactose, xylose, arabinose, etc. as well as starch, saccharified starch solution and the like. A single carbon source may be employed or a mixture of two or more. In order to obtain an ammonium ion concentration of greater than 0.2 mole per liter, various organic and inorganic nitrogen compounds such as ammonia, ammonium chloride, ammonium sulfate, ammonium citrate, urea and the like may be employed. Chlorides such as sodium chloride, potassium chloride, calcium chloride, etc. may be employed in order to supply the necessary amount of chloride ion to the medium. However, as shown in Table 3 hereinabove, it is preferable and effective, particularly from the point of view of economics, to employ ammonium chloride as the source of both the ammonium and the chloride ion. Various natural substances containing nitrogen may also be used as the nitrogen source and include such natural nutrient sources such as peptone, meat extract, cornsteep liquor, yeast extract, casein hydrolysates and the like. Mixtures of these various sources may be used.

In addition to the above-mentioned nutrient sources, there may also be employed inorganic compounds of phosphoric acid, such as potassium dihydrogen phosphate and potassium monohydrogen phosphate, as well as other inorganic salts of potassium, magnesium, manganese, etc. Examples thereof include magnesium sulfate, calcium carbonate, manganese sulfate and the like. Substances containing at least a portion of nutrients such as biotin, thiamine, cobalamin, etc. may also be added advantageously and effectively to the culture medium.

It has been noted, however, that the addition of zinc compounds to the culture medium tends to accelerate the production of glutamine and to reduce considerably the amount of N-acetylglutamine produced. Therefore, the addition of substances containing zinc to the nutrient medium should preferably be avoided.

The fermentation in accordance with the present invention is carried out under aerobic conditions, such as aerobic shaking of the culture or with stirring of a submerged culture, at a temperature of about 24° to 37° C., preferably 28°–33° C. At the start of or during culturing, it is desirable to adjust the pH of the medium to within 5 to 9, and preferably to nearly a neutral level. After about 2 to 4 days of culturing under these conditions, N-acetylglutamine is found to be accumulated in the culture medium.

After the completion of fermentation, the resultant N-acetylglutamine may be separated from the culture liquor by conventional means, such as ion exchange resin treatment, extraction with solvents, precipitation with metallic salts, chromatography and the like. As an effective and advantageous example thereof, the microorganism cells are removed from the culture solution, and the filtarte is passed through a basic anion exchange resin column. It is then eluted out therefrom with a dilute alkali or a dilute acid. The eluent is then passed through a strongly acidic ion exchange resin column in order to adsorb the N-acetylglutamine as well as any by-produced amino acid product. Then, the physically adsorbed N-acetylglutamine is dissolved out with water. The N-acetylglutamine eluent fraction is concentrated under reduced pressure in order to crystallize the same and thereby to obtain crude crystals of N-acetylglutamine.

The following examples are given merely as illustrative of the present invention and are not to be considered as limiting. Unless otherwise noted, the percentages therein are by weight.

EXAMPLE 1

A culture medium of 18 liters consisting of the following components is prepared:

| | | |
|---|---|---|
| Glucose | percent | 13.0 |
| $MgSO_4 \cdot 7H_2O$ | do | 0.05 |
| $KH_2PO_4$ | do | 0.05 |
| $K_2HPO_4$ | do | 0.05 |
| $FeSO_4 \cdot 7H_2O$ | do | 0.002 |
| $MnSO_4 \cdot 4H_2O$ | do | 0.002 |
| Biotin | $\gamma/l$ | 5.0 |
| Thiamine hydrochloride | mg./l | 1 |
| $NH_4Cl$ | percent | 4.0 |
| Urea | do | 0.3 |

The $NH_4Cl$ and urea are distilled separately.

This culture medium is placed in a 30 liter jar fermentor, and 2 liters of seed medium containing *Micrococcus glutamicus* M-34 ATCC 21009 is added thereto. Culturing is then carried out under aerobic conditions at a temperature of 30° C., a ventilation rate of 10 liters per minute and agitation at the rate of 400 r.p.m. The pH is adjusted to 6.8 for 16 hours from the beginning of fermentation and then to 6.5 with an 18% aqueous solution of ammonia.

The concentration of N-acetylglutamine in the culture liquor after 72 hours of culturing is found to be 33.8 mg./ml. Simultaneously, the amount of by-product glutamic acid produced is 1.2 mg./ml. and that of by-product glutamine is 6.3 mg./ml.

After filtration, the filtrate is adsorbed by passing the same through a strongly basic anion exchange resin column (Amberlite IRA–400, a trade name of Rohm & Haas, U.S.A.). The filtrate is then eluted out with 0.5 N $H_2SO_4$, and the resultant eluent is passed through a strongly acidic cation exchange resin column (Diaion SK #1, a trade name of Mitsubishi Kasei, Japan). The N-acetylglutamine is dissolved out therefrom with water. The N-acetylglutamine fraction obtained is concentrated and crystallized under reduced pressure to obtain 528 grams of crude crystals of N-acetylglutamine. These crystals are dissolved in hot water and treated with active carbon. Then, the filtrate is again concentrated and crystallized under reduced pressure to obtain 423 grams of colorless crystalline needles of N-acetylglutamine.

EXAMPLE 2

A culture medium of 18 liters consisting of the following components is placed in a 30 liter jar fermentor:

| | | |
|---|---|---|
| Glucose | percent | 13.0 |
| $MgSO_4 \cdot 7H_2O$ | do | 0.05 |
| $KH_2PO_4$ | do | 0.05 |
| $K_2HPO_4$ | do | 0.05 |
| $FeSO_4 \cdot 7H_2O$ | do | 0.002 |
| $MnSO_4 \cdot 4H_2O$ | do | 0.002 |
| Biotin | $\gamma/l$ | 5.5 |
| Thiamine hydrochloride | mg./l | 1 |
| $(NH_4)_2SO_4$ | percent | 4.0 |
| Calcium chloride ($CaCl_2$) | do | 3.5 |
| Urea | do | 0.3 |

Two liters of seed medium containing *Brevibacterium ammoniagenes* No. 4602 ATCC 21012 is added to the said culture medium. Culturing is then carried out at a temperature of 30° C. under aerobic conditions with a ventilation rate of 10 liters per minute and agitation at the rate of 350 r.p.m. For 24 hours after the start of culturing, the pH of the medium is adjusted to 7.0, and then to 6.4 with an 18% aqueous solution of ammonia. The concentration of N-acetylglutamine in the culture liquor after 60 hours of culturing is 38.2 mg./ml. At the same time, the production amount of by-product glutamic acid is 1.8 mg./ml. and that of by-product glutamine is 3.6 mg./ml.

The resultant culture liquor is treated in the same manner as described in Example 1 and 595 grams of crude crystals of N-acetylglutamine is obtained therefrom.

EXAMPLE 3

Culturing is carried out under the same conditions and with the same culture medium as described in Example 1 except that 2 liters of a seed medium containing *Micrococcus glutamicus* MF–35 ATCC 21010 is added to the culture medium as the N-acetylglutamine producing microorganism. After the completion of culturing, the culture liquor contains 28.3 mg./ml. of N-acetylglutamine, 2.0 mg./ml. of glutamic acid and 6.0 mg./ml. of glutamine. By treating the culture liquor in the same manner as described in Example 1, 340 grams of colorless crystalline needles of N-acetylglutamine is obtained.

EXAMPLE 4

Culturing is carried out under the same conditions and with the same culture medium as described in Example 1 except that 2 liters of a seed medium containing *Micrococcus glutamicus* MF–39 ATCC 21011 is added to the culture medium as the N-acetylglutamine producing microorganism. After the completion of culturing, the culture liquor contains 30.5 mg./ml. of N-acetylglutamine, 2.1 mg./ml. of glutamic acid and 6.2 mg./ml. of glutamine. By treating the culture liquor in the same manner as described in Example 1, 350 grams of colorless crystalline needles of N-acetylglutamine is obtained.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. In a fermentation process for the production of N-acetylglutamine by culturing a microorganism capable of producing N-acetylglutamine in an aqueous nutrient medium under aerobic conditions, the improvement which comprises conducting the fermentation in a nutrient medium which contains greater than 0.2 mole per liter each of ammonium and chloride ions.

2. The process of claim 1, wherein said nutrient medium contains at least one sugar as the major source of carbon.

3. The process of claim 1, wherein the amount of ammonium ion employed and the amount of chloride ion employed, respectively, is from about 0.5 to 0.8 mole per liter.

4. The process of claim 1, wherein the source of said ammonium and chloride ions is ammonium chloride.

5. A process for producing N-acetylglutamine which comprises culturing a microorganism capable of producing N-acetylglutamine under aerobic conditions in an aqueous nutrient medium containing greater than 0.2 mole per liter each of ammonium and chloride ions and recovering the N-acetylglutamine from the resultant culture liquor.

6. The process of claim 5, wherein said culturing is carried out at a temperature of from about 24° to 37° C. and at a pH of about 5 to 9.

7. The process of claim 6, wherein said nutrient medium contains at least one sugar as the major source of carbon.

8. The process of claim 7, wherein the amount of ammonium ion employed and the amount of chloride ion employed, respectively, is from about 0.5 to 0.8 mole per liter.

9. The process of claim 6, wherein the source of said ammonium and chloride ions is ammonium chloride.

10. The process of claim 6, wherein said microorganism belongs to a genus selected from the group consisting of Brevibacterium and Micrococcus.

11. The process of claim 10, wherein said microorganism is selected from the group consisting of *Micrococcus glutamicus* ATCC 21009, *Micrococcus glutamicus* ATCC 21010, *Micrococcus glutamicus* ATCC 21011 and *Brevibacterium ammoniagenes* ATCC 21012.

12. A process for producing N-acetylglutamine which comprises culturing a microorganism selected from the group consisting of *Micrococcus glutamicus* ATCC 21009, *Micrococcus glutamicus* ATCC 21010, *Micrococcus glutamicus* ATCC 21011 and *Brevibacterium ammoniagenes* ATCC 21012 under aerobic conditions at a temperature of from about 24° to 37° C. and at a pH of about 5 to 9 in an aqueous nutrient medium containing at least one sugar as the major source of carbon and from about 0.5 to 0.8 mole per liter each of ammonium and chloride ions and recovering the N-acetylglutamine from the resultant culture liquor.

13. The process of claim 12, wherein the N-acetylglutamine is recovered from the resultant culture liquor by means of an ion exchange resin treatment.

References Cited

UNITED STATES PATENTS 3,216,906　11/1965　Kinoshita et al. _____ 195—29

FOREIGN PATENTS 18,035　　1965　Japan.

OTHER REFERENCES

Chemical Abstracts, vol. 63, 17095h–17096a.

LIONEL M. SHAPIRO, Primary Examiner

U.S. Cl. X.R.

195—47